(12) United States Patent
Klepsch

(10) Patent No.: US 6,343,924 B1
(45) Date of Patent: Feb. 5, 2002

(54) ARRANGEMENT WITH CONVEYOR BELTS FOR THE MANUFACTURE OF MOLDED ARTICLES

(75) Inventor: Rudolf Klepsch, Vienna (AT)

(73) Assignee: Firma Ploytech Klepsch & Co. GmbH, Vienna (AT)

( * ) Notice: Subject to any disclaimer, the term of this patent is extended or adjusted under 35 U.S.C. 154(b) by 0 days.

(21) Appl. No.: 09/308,892

(22) PCT Filed: Nov. 26, 1997

(86) PCT No.: PCT/AT97/00258

§ 371 Date: May 26, 1999

§ 102(e) Date: May 26, 1999

(87) PCT Pub. No.: WO98/23426

PCT Pub. Date: Jun. 4, 1998

(30) Foreign Application Priority Data

Nov. 27, 1996 (AU) ............................................. 2061/96

(51) Int. Cl.[7] ............................................. B29C 43/22
(52) U.S. Cl. ........................ 425/223; 425/337; 425/371; 425/372; 425/373
(58) Field of Search ................................. 425/223, 337, 425/371, 372, 373

(56) References Cited

U.S. PATENT DOCUMENTS

| | | | | |
|---|---|---|---|---|
| 3,376,371 A | * | 4/1968 | Opel et al. ................... | 264/216 |
| 4,741,623 A | * | 5/1988 | Haeuser et al. ............. | 366/160 |
| 4,824,354 A | * | 4/1989 | Keaton ........................ | 425/345 |
| 5,167,781 A | * | 12/1992 | Kemerer et al. ............ | 264/166 |
| 5,372,493 A | * | 12/1994 | Rodgers ...................... | 425/188 |

FOREIGN PATENT DOCUMENTS

| | | | |
|---|---|---|---|
| FR | 1 570 106 | * | 6/1969 |
| JP | WO 85/05314 | * | 12/1985 |

* cited by examiner

Primary Examiner—Nam Nguyen
Assistant Examiner—Joseph S Del Sole
(74) Attorney, Agent, or Firm—Pitney, Hardin, Kipp & Szuch LLP

(57) ABSTRACT

The invention relates to an arrangement for the manufacture of plastic molded parts such as sheets, strips or the like which allows the continuous manufacture and largely ensures the avoidance of wastes. The arrangement according to the invention includes two revolving conveyor belts (9, 10) running parallel to each other and arranged at a distance of each other, sealed along their longitudinal edges by adjustable sealing members (16). A liquid plastic material, which is evenly distributed across the entire width of the conveyor belts (9, 10) is fed into the intake gap between the conveyor belts (9, 10) by a distributor means (6) comprising at least two containers (2) holding a monomeric component. The conveyor belts are placed in a chamber (22) in which the temperature required for solidification or polymerization of the liquid plastic material is achieved by heating means (25) while transported by the said conveyor belts (9, 10). The solidified, sheet-like plastic material leaves the chamber (22) via a discharge opening (24), is removed by extracting rollers (36) and subdivided by a separating means (39) into pieces of a predetermined length.

32 Claims, 4 Drawing Sheets

ARRANGEMENT WITH CONVEYOR BELTS FOR THE MANUFACTURE OF MOLDED ARTICLES

CROSS REFERENCE TO RELATED APPLICATIONS

This application is a National Phase filing under 35 U.S.C 371 of PCT/AT97/00258.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF INVENTION

1. Fielf of Invention

The invention relates to an arrangement for the manufacture of plastic molded parts such as sheets, profiles or the like, with at least two containers holding a liquid monomeric component which via feed lines and a mixing arrangement are connected to a mold in which the liquid plastic material solidifies into a molded article.

2. Description of Related Prior Art

It is already known to manufacture molded plastic articles by mixing two monomeric components situated in separate vessels, in particular caprolactam melts, to which an activator or catalyst is added, and which are then heated to an appropriate temperature. In that case, the monomeric components are cast in liquid state into appropriately tempered molds where they are polymerized without pressure. A disadvantage of this known method is that the molded articles are not manufactured continuously, but that the dimensions are limited by the size of the molds into which the liquid monomeric components are cast. Since such molds cannot be made available in a large enough number of different dimensions, the molded articles thus manufactured must be subsequently treated, in particular they must be cut to the desired size, which results in wastes that cannot be utilized. Furthermore, this known method as a rule leads to the formation of so-called feeder heads on the upper surfaces, similar to those formed in metal casting, which must be separated from the molded article after polymerization, which also requires an additional working process and leads to further waste.

BRIEF SUMMARY OF INVENTION

Object of the present invention is to create an arrangement for the manufacture of molded articles which allows the continuous manufacture and the simple adaptation to the desired dimensions of the molded articles to be made, so that the production of waste can be avoided, and the work required for manufacturing can be reduced and simplified. To achieve this objective, the invention recommends that the mold is provided with two revolving conveyor belts running parallel to each other and arranged at a distance of each other, and that a distributor means is provided that feeds the liquid plastic material into the intake gap between the conveyor belts. If, as in the known method, the molded articles are formed from two polymerized monomeric components, it is advantageous to provide at least four containers, so that it is possible to switch to one container pair while the other pair becomes empty, thus avoiding the necessity to interrupt the continuous manufacturing process. The distributor means is used to distribute the liquid plastic material evenly across the entire width of the intake gap and subsequently moved on across the two conveyor belts whose length is designed so that this plastic material solidifies and is polymerized while it is being moved, and the finished solidified molded article exits from the outlet gap of the two conveyor belts.

It is practical to provide the feed line, preferably in the area where it leads into the distributor means, with a casting valve so that the quantity of the liquid plastic material can be adjusted by regulating the valve opening time, thus adapting the quantity to whatever is in demand.

It is practical for the conveyor belts to be downwardly inclined from the distributor means, and advantageously the incline can be adjusted. This ensures that the entire width of the conveyor belts can be loaded by the distributor means, and the occurrence of skips due to an insufficient material supply can be avoided. When the incline is adjustable, it can be adapted in particular to the thickness of the molded articles to be manufactured, which corresponds to the distance between the two conveyor belts. To manufacture molded articles of different thickness, it is therefore only necessary to make the distance between the two conveyor belts adjustable, which can be achieved without difficulty by mounting the deflection rollers on adjustable trestles.

According to a preferred embodiment of the invention, a sealing member, for example made of silicone rubber, is provided in the area of the two longitudinal edges of at least one conveyor belt. This sealing member may, for example, be formed of a compressible elastic hollow section which, due to its elasticity, can adapt itself to distances of different size between the two conveyor belts. By changing the position of the sealing members on the conveyor belt, the width of molded element to be manufactured can be changed without difficulty. Thus, the arrangement according to the invention makes it possible and simple to vary the thickness as well as the width of the molded elements to be manufactured.

To allow a simple change in the position of the sealing members, these lie loosely on the conveyor belt, according to another characteristic of the invention, and they are fixed in their position thanks to the support straps abutting on their outsides, which are supported by guides fastened to the conveyor belt preferably in the form of rivets. To change the position of the sealing members, only the support straps must be exchanged. These support straps also serve the purpose of preventing the lateral deflection of the elastic sealing members and thus to ensure that an exact lateral delineation is created for the molded articles to be manufactured.

When the manufactured molded articles are sheet-shaped, the liquid plastic material is fed by the distribution means directly to the inlet gap between the conveyor belts, whereby the shape of the sheet-shaped molded articles is determined by the distance between the conveyor belts and the distance between the sealing members. However, the present invention also allows the manufacture of molded articles which are not sheet-shaped, i.e. for example of profiles with a round or angular cross section. To manufacture such profiles according to the invention, cavities corresponding to the profiles to be manufactured, preferably made of silicone rubber, can be arranged between the two conveyor belts, and the liquid plastic material is then fed into those cavities. These mold sections are divided, with one part supported on the upper conveyor belt and one part on the lower conveyor belt. Each mold part is continuous and revolves with one of the two conveyor belts, while a closed mold is created which forms the mold for the cavities. Again, the molded articles can be fixed against lateral displacement via the guides fastened to the conveyor belt.

It is practical for the distributor means to consist of a tube system emptying into the inlet gap. If in the manufacture of thick sheets, the inlet gap between the two conveyor belts is large enough, it is possible that the distributor means extends into the space between the two conveyor belts without touching the belts, in which case no other lateral delineation is necessary. However, when the inlet gap is small, it is not possible to let the distributor means formed by the tube system extend between the two conveyor belts without touching the conveyor belts. In that case, stationary sealing members, preferably of triangular profile, must be provided to act as lateral limitation for the inlet gap.

It is practical for the distributor means to be provided with measuring contacts for measuring the quantity of the liquid plastic material fed into the intake gap, whereby the measuring contacts are preferably actively connected to the casting valve. In that case, the supply of the liquid plastic material is regulated via the casting valve, depending on the amount of liquid plastic material fed into the intake gap, i.e. when the maximum amount is reached, the casting valve closes, and when the minimum amount is reached, the casting valve opens. With such a control, the conveyor belts are driven at a constant speed that is precisely adjusted to the desired dose. However, the casting valve may also be open all the time, so that a certain amount of the liquid plastic material is fed constantly into the intake gap, in which case the drive of the conveyor belts is controlled via the measuring contacts.

An appropriately high temperature is necessary to solidify or polymerize the plastic material that is supplied. Therefore, the invention calls for a heating means in the area of the intake gap, preferably an electric radiant heater, which ensures the required polymerization temperature. To maintain this temperature, another characteristic of the invention calls for the conveyor belts to be arranged in a chamber which is provided on one front face, in the area of the distributor means, with an intake opening and on the opposite front face with a discharge opening for the molded article(s). In this case, the heating means is preferably arranged outside the chamber, whereby the chamber wall adjacent to the heating means is provided with a window, for example of vitrified ceramics, that allows heat radiation to permeate. This eliminates the danger that the caprolactam vapor will explode, which could happen at high temperatures.

An even temperature is achieved if the two front faces of the chamber are provided with air openings which are connected to an air circulation line provided outside the chamber, and if the line is preferably connected to a fan.

To remove liquid plastic material that may leak in the area of the sealing members which form the lateral limit of the mold primarily formed by the conveyor belts, collector troughs to catch such leaking liquid plastic material are provided below the longitudinal edges of the bottom conveyor belt, whereby the troughs empty into a collector bin connected to the chamber.

To prevent the unwanted deflection of the conveyor belts during solidification or polymerization, and thus to ensure the even thickness of the molded articles to be manufactured, a preferred embodiment of the invention calls for the conveyor belts to be provided with a sliding support on plates, preferably made of stainless steel. These plates may be provided with air-permeable openings through which compressed air can be supplied which creates a cushion of air between the conveyor belt and the supporting plate, thus reducing friction losses.

Preferably, an extracting roller connected to the discharge opening of the chamber and a separating means movable across the feed direction of the extracting roller are provided. The extracting roller ensures the removal of the solidified molded articles coming out of the discharge gap of the conveyor belts, and the separating means automatically cuts these articles to the desired length.

It is important that the conveyor belts can withstand the high temperatures of up to 190 C which occur during polymerization, and also that the belts are completely level and are not raised at the joint, which would result in an uneven surface of the molded articles to be manufactured. For those reasons it is practical if the conveyor belts are made either of continuous textile or plastic belts which preferably are provided with a coating of polytetrafluoroethylene or of steel belts butt-welded at the joints.

The arrangement according to the invention also allows the manufacture of sheet-shaped molded plastic articles, in particular of polyamide, whose surfaces are provided with a covering layer in the form of a metal foil or the like, which is applied in a single operation. Such plastic sheets provided with a covering layer made of a metal foil or the like are already known, but although they have many advantages, they have not been well-received because until now, the covering layer had to be applied to the plastic sheets in a press, in a separate operation involving an adhesive, a process that has been complicated and expensive. According to the invention, an unwinding means can be provided above the top conveyor belt and/or below the bottom conveyor belt for a metal belt, consisting for example of aluminum foil or steel foil, which adjoins the conveyor belt and moves with same and is thus carried along into the intake gap by the moving conveyor belt. When the liquid plastic material is fed into the intake gap, it combines with the plastic material during polymerization which takes place between the two conveyor belts. Especially when the plastic material consists of cast polyamide 6 or a PA rubber block polymer, an excellent bond is achieved between the plastic material and the covering layers.

The molded articles manufactured by means of the arrangement according to the invention can also be fiber-reinforced. For that purpose, the invention suggests that at least one of the containers which holds the monomer can be connected to a device for admixing reinforcement fibers such as glass fibers, carbon fibers and/or aramid fibers, and preferably provided with a mixing means which ensures that the introduced fibers and the monomer are well-mixed.

BRIEF DESCRIPTION OF THE DRAWINGS

In the drawings, the invention is described by means of an embodiment which is shown schematically as follows.

DETAILED DESCRIPTION OF THE INVENTION

Figure 1:
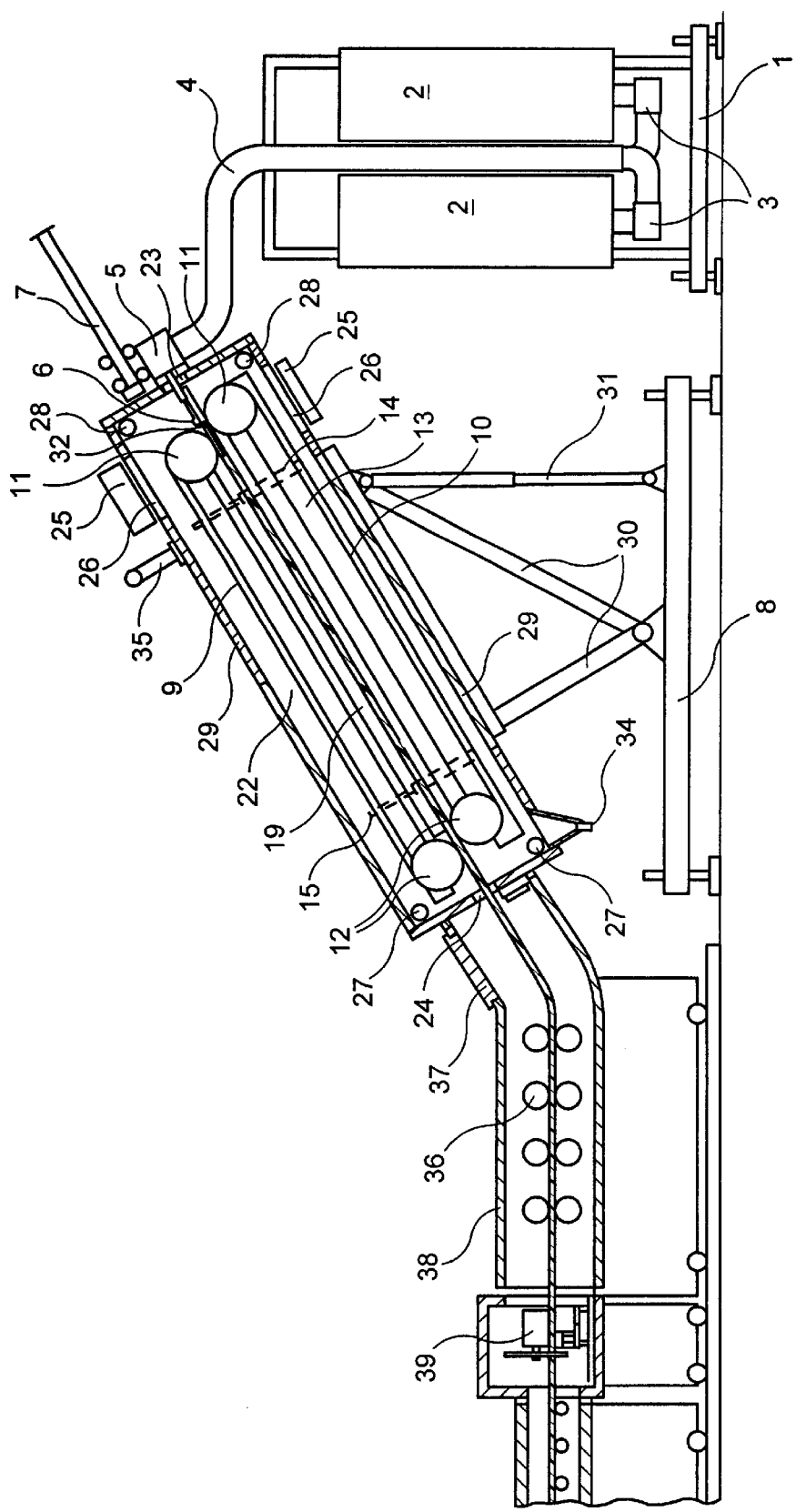
FIG. 1 shows a longitudinal section through an arrangement according to the invention.
Figure 1A:
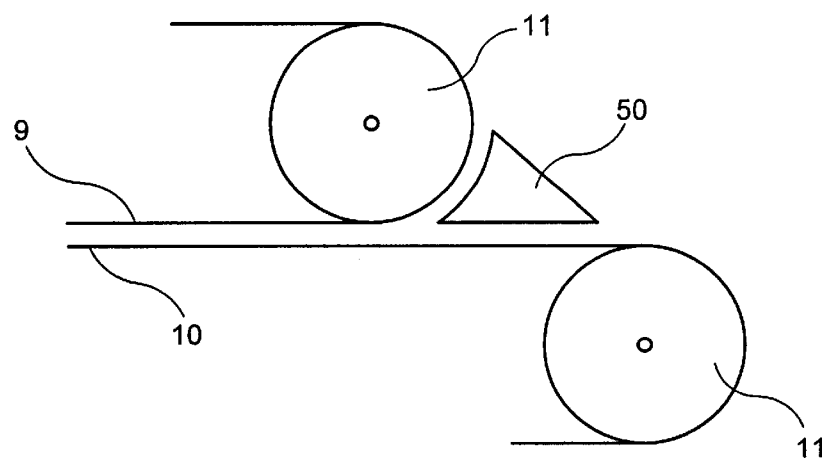
FIG. 1A is a schematic view of the triangular sealing member.
Figure 1B:
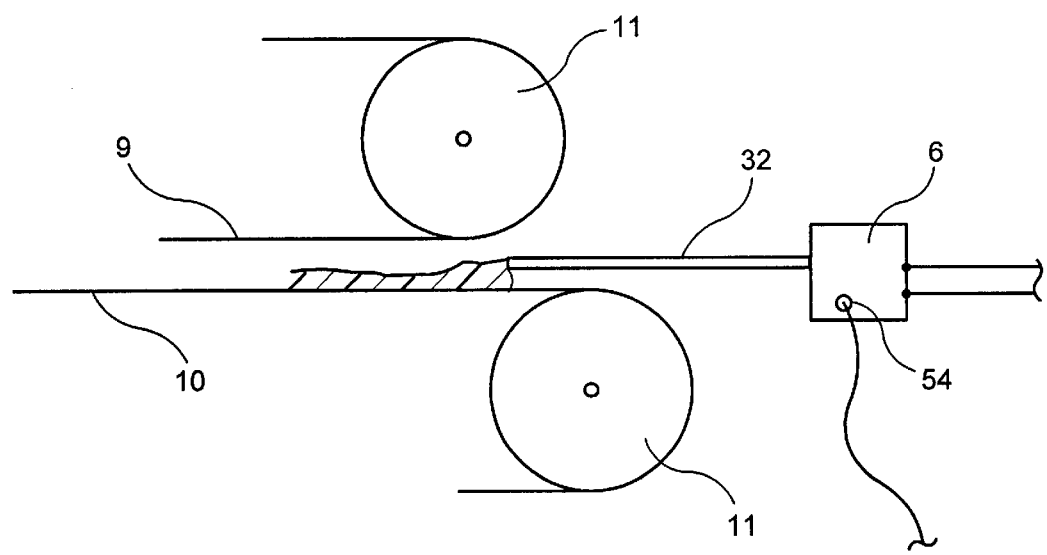
FIG. 1B is a schematic view of the measuring contacts.
Figure 1C:
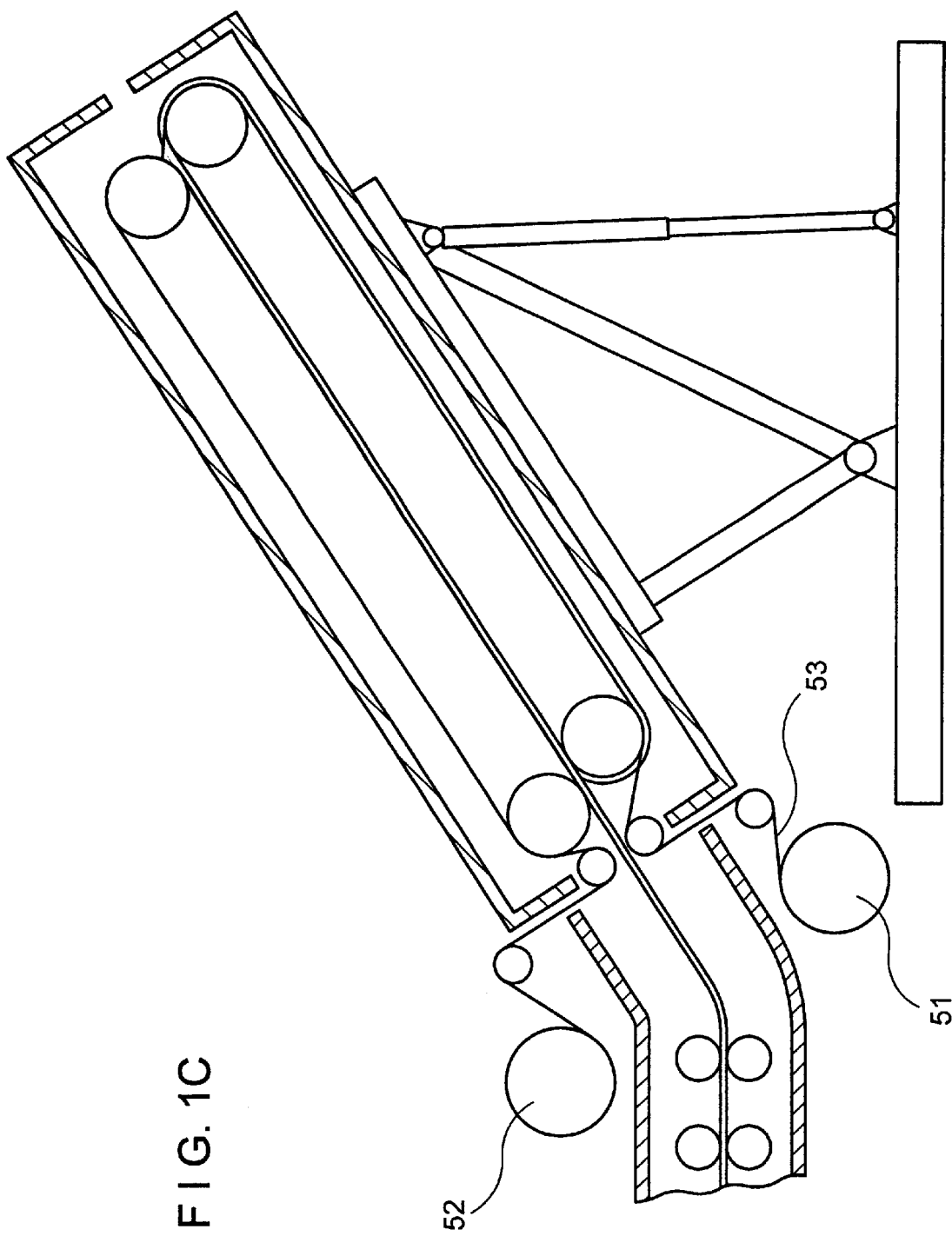
FIG. 1C is a schematic view of the unwinding means.

The arrangement according to the invention shown in FIG. 1 shows two containers 2 mounted on a rack 1, each containing one of the two monomeric components from which the molded articles are to be manufactured. For example, one of the two containers may hold caprolactam melt with an activator, while the other container holds caprolactam melt with a catalyst. It is practical to provide several container pairs, which has the advantage that it is possible to switch to one container pair while the other pair becomes empty, and that the empty container pair can be refilled while additives may be admixed, and while the casting temperature may be readjusted. Another advantage of providing several container pairs is that it is possible to switch to a container pair which holds another shade of color, so that molded articles of different colors can be manufactured without the necessity of interrupting the production.

If fiber-reinforced molded articles are to be manufactured with the arrangement according to the invention, at least one of the two containers 2 is connected to a means (not shown) for admixing reinforcement fibers, such as glass fibers, carbon fibers and/or aramid fibers. It is practical to mix the reinforcement fibers thus added to this container with a monomeric component in the container by using a conventional mixing means (also not shown).

The liquid monomeric components are moved by means of metering pumps 3 and heated feed lines 4 from the two containers 2 to a casting valve 5 which feeds a distributor means 6 and where the two monomeric components are mixed. The casting valve 5 and the distributor means 6 slide on rollers in guide 7, which means that the distributor means 6 can be pushed into a position in which it can be cleaned and replaced in order to adapt to molded articles of different widths.

The liquid plastic material formed from the two mixed monomeric components, i.e. the activated melt, is moved via the distributor means 6 to the intake gap between the two conveyor belts 9, 10 mounted on a base 8, parallel to each other and at a distance from each other. The two conveyor belts 9, 10 are running on the deflection rollers 11, 12, respectively, with one of the two rollers of each conveyor belt being driven by an infinitely variable drive, while the other deflection roller is provided with a clamping means which keeps the conveyor belts 9, 10 tightened.

The deflection rollers 11, 12 of the bottom conveyor belt 10 are firmly mounted in a frame 13, while the mounting of the top conveyor belt 9 can be continuously adjusted by means of lifting spindle pairs 14, 15 (only indicated), which means that the spacing between the two conveyor belts and thus the size of the intake gap can be changed and adapted to the thickness of the molded article to be manufactured. Due to shrinkage during solidification, the rear lifting spindle pair 15 must always be set to a lesser thickness.

Figure 2:
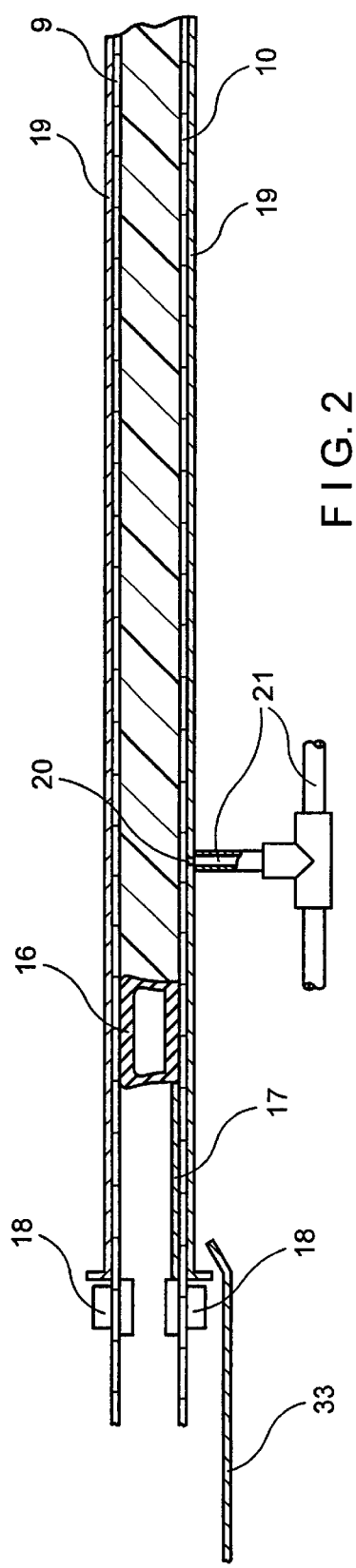
FIG. 2 and 3 show enlarged sectional views of the conveyor belts of the arrangement according to the invention.

As FIG. 2 shows, lateral sealing between the two conveyor belts 9, 10 in the area of their longitudinal edges is accomplished by the sealing members 16, for example in the form of silicone rubber profiles, which lie loosely on the conveyor belts 9, 10 and are held in position by the support straps 17. The sealing members 16 are butt-bonded so that the joint does not reduce the sealing effect. The support straps 17 are braced against guides 18 in the form of rivets fastened to conveyor belt 9 or 10. The distance between the two sealing members defines the width of the molded articles to be manufactured. By changing the position of these sealing members, this width can therefore be adjusted while an exchange of support straps 17 ensures that the appropriate distance between the sealing members is maintained. By exchanging the sealing members 16, they can be adapted to the distance set between the two conveyor belts 9, 10 while, due to the elasticity of the sealing members, the distance between the conveyor belts 9, 10 can be changed within certain limits without exchanging the sealing members. The exchange of sealing members 16 and the support straps 17 can be accomplished by simply pulling them off sideways from the conveyor belts.

If it is intended to manufacture molded articles of plastic which are provided with covering layers of aluminum foil or steel foil, unwinding means for a metal belt 53 can be provided above the top conveyor belt 9 and below the bottom conveyor belt 10. The metal belts pulled off the unwinding means are guided in such a way that they adjoin conveyor belt 9 or 10 and are thus pulled off across the conveyor belt and moved on by means of the conveyor belt, whereby during the solidification or polymerization of the plastic material between the conveyor belts, a connection is established between the plastic material and the metal foil, accomplishing an excellent bond.

As FIG. 2 also shows, a sliding support on stainless-steel plates 19 is provided for the conveyor belts 9, 10 in those areas where the solidification or polymerization of the plastic material takes place. To compensate for the different rates of heat expansion, plates 19 are resting on a sliding support structure which is connected via heat insulation to a subconstruction.

To minimize the friction losses between the moving conveyor belts 9, 10 and the stationary plates 19, air-permeable openings 20 must be provided in the plates 19 which are supplied with compressed air heated in a line 21, so that the conveyor belts 9, 19 can slide on a cushion of air.

The deflection rollers 11, 12, the frame 13 and the lifting spindle pairs 14, 15 of the two conveyor belts 9, 10 are housed in a chamber 22 whose one front face is provided with an intake opening 23 for the distributor means 6 and whose opposite front face is provided with a discharge opening 24 for the solidified molded article. Outside chamber 22 are heating means 25 in the form of electric radiant heaters whose heat is radiated over a window 26 made of vitrified ceramics that allows heat radiation to permeate into the interior of chamber 22. The advantage of this arrangement of the heating means is that it eliminates the danger that explosive gases formed in the solidification or polymerization in the interior of chamber 22 will ignite.

In the area of its two front faces, chamber 22 is provided with air openings 27, 28 which are connected to an air circulation line (not shown) with a fan, arranged outside chamber 22. Furthermore, the heating means 25 can be controlled via a thermo sensor (not shown) in chamber 22.

The housing 29 surrounding chamber 22 is pivotably connected via arms 30 with base 8, and its incline can be adjusted via a spindle drive 31. Thus, the incline of the conveyor belts 9, 10 can be changed and in particular adapted to the individually adjusted intake gap, i.e. to the thickness of the molded article to be manufactured. The angle of incline is necessary to ensure that the plastic material can be fed by the distributor means 6 through the intake gap without leaking. The distributor means 6 is provided with a tube system 32 extending across a width of the intake gap which must be narrower than the width of the molded article to be manufactured. In case of a large intake gap, this tube system 32 may protrude into the intake gap without touching the conveyor belts 9, 10. In case of a small intake gap, as in the manufacture of thin molded articles, it is not possible to let the tube system 32 protrude into the space between the two conveyor belts 9, 10. In that case, to avoid the unwanted leaking of the liquid plastic material in the area of the intake gap, stationary sealing members, preferably of triangular profile are provided to act as lateral limitation for the inlet gap.

Distributor means 6 is provided with measuring contacts for measuring the amount of liquid plastic material supplied to the intake gap. With these measuring contacts, the casting valve 5 can be controlled in such a way that with the conveyor belts 9, 10 revolving at a constant speed, the right amount of liquid plastic material necessary for the manufacture of the molded articles, which depends on the size of the intake gap, is available. However, a constant amount of the liquid plastic material can also be supplied to distributor means 6 by adjusting the casting valve 5 accordingly, in which case the measuring contacts regulate the speed of the conveyor belts. To remove liquid plastic material that may leak in the area of the sealing members 16, collector troughs 33 (see FIG. 2) are provided below the longitudinal edges of the bottom conveyor belt 10, whereby the troughs empty into a collector bin 34 connected with housing 29 of chamber 22, from which the plastic material can be removed.

The controlled removal of the vapors generated during polymerization in chamber 22 is accomplished via an exhaust pipe 35 provided with a stop valve.

The conveyor belts 9, 10 consist of continuous textile or plastic belts, made for example of a continuously woven aramid fabric, with a coating of polytetrafluorethylene, or of a silicone rubber belt, or of steel belts butt-welded at the joints. In every case, the conveyor belts 9, 10 must be able to withstand a mixing temperature of the supplied liquid plastic material of about 125 C and the temperature of the polymerizate which increases up to 190 C.

The solidified plastic material coming out of discharge opening 24 is removed via an extracting roller 36 which is accommodated in housing 38 provided with a flap 37. When flap 37 is opened, the molded article coming out of the discharge opening can be fed into the extraction roller 36 at the beginning of production. Next to the extraction roller 36, a separating means 39 is provided which can be moved across the feed direction of the extraction roller 36 and which divides the manufactured continuous molded article into pieces of predetermined length.

The arrangement described above can be used to manufacture sheet-shaped molded articles of variable width and thickness.

Figure 3:
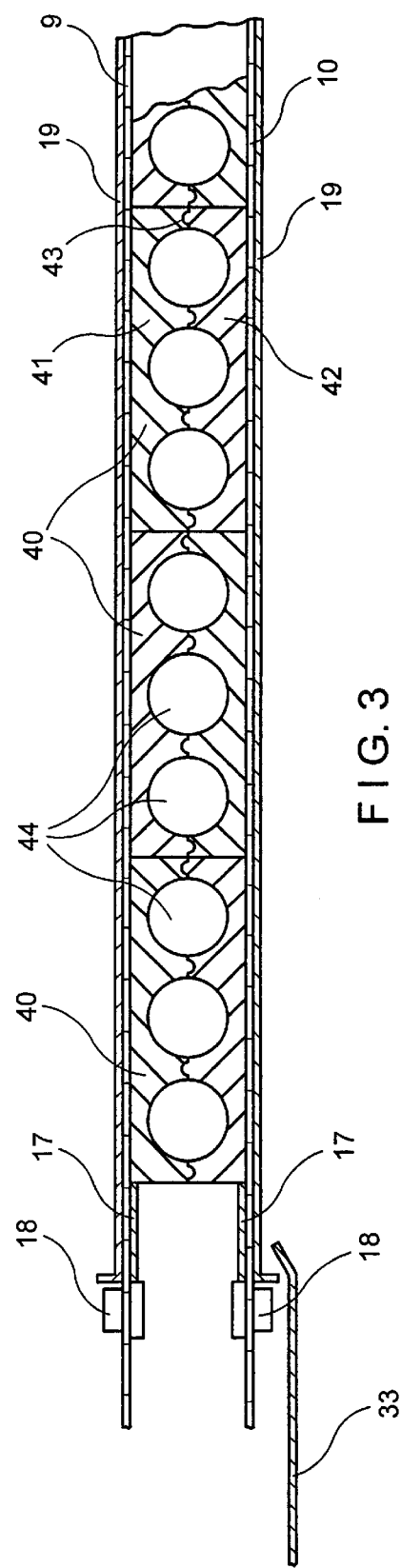

The arrangement according to the invention also allows the manufacture of profiles. As FIG. 3 shows, in that case, mold sections 40 made of silicone rubber are arranged between the two conveyor belts 9, 10. These mold sections consist of two parts 41, 42 whose contact surfaces are provided with semicircular protrusions or recesses 43 for centering. Each of the two parts 41, 42 is continuous, with part 41 being carried along with the top conveyor belt and part 42 with the bottom conveyor belt. After passing the intake gap, the two parts 41, 42 adjoin each other and are centered by the protrusions or recesses 43, which creates cavities 44 which correspond to the shape of the profiles to be manufactured and in which the plastic material polymerizes. The mold sections 40 as well as the sealing members 16 are held in position by support straps 17 braced against guides 18.

DRAWINGS

See attached.

SEQUENCE LISTING

Not Applicable.

What is claimed is:

1. Apparatus for the manufacture of molded plastic articles such as sheets or profiles with two revolving conveyor belts (9, 10), said conveyor belts comprising an upper belt and a lower belt, said upper belt being on top of said lower belt, wherein said conveyor belts run on deflection rollers, wherein said conveyor belts are arranged essentially parallel to each other, run concurrently with each other and at a distance of each other and a distributor means (6) situated adjacent to an intake gap which is supplied via a line with liquid plastic material which solidifies into molded articles between the revolving conveyor belts (9, 10), wherein at least two containers (2) are provided which are connected via separate lines (4) to a mixing means (5) arranged upstream of the distributor means (6), wherein each of said conveyor belts has two longitudinal edges and wherein two sealing members (16) positioned adjacent to and at a fixed distance from each of the two said longitudinal edges are provided, wherein each of said sealing members has an inside oriented toward said liquid plastic material, and an opposing outside oriented away from said liquid plastic material, wherein the sealing members (16) lie between said conveyor belts (9, 10) and are fixed in position by support straps (17) abutting said outside of said sealing members, which are supported by guides (18) fastened to the conveyor belts (9, 10).

2. Apparatus according to claim 1, wherein in the mixing means is provided in a casting valve (5) upstream of the distributor means (6).

3. Apparatus according to claim 1, wherein between the two conveyor belts (9, 10) continuous mold sections (40), for the manufacture of profiles, in two parts are arranged with cavities corresponding to the profiles to be manufactured, whereby one part (41) is supported on said upper belt (9) and one part (42) is supported on said lower belt (10), and wherein said continuous mold sections rotate with said conveyor belts.

4. Apparatus according to claim 1 wherein said distributor means (6) consists of a tube system (32) emptying into the intake gap.

5. Apparatus according to claim 1, wherein stationary sealing members are provided to act as lateral limitation for the intake gap.

6. Apparatus according to claim 2 wherein the distributor means (6) is provided with measuring contacts for measuring the quantity of the liquid plastic material fed into the intake gap.

7. Apparatus according to claim 1 wherein a sliding support is provided for the conveyor belts (9, 10) on plates (19).

8. Apparatus according to claim 7 wherein the plates (19) are provided with air-permeable openings (20).

9. Apparatus according to claim 1 wherein the conveyor belts (9, 10) consist of continuous textile or plastic belts.

10. Apparatus according to claim 1 wherein at least one of the conveyor belts (9, 10) consist of a steel belt which is butt-welded.

11. Apparatus according to claim 1 wherein above said upper belt (9) and/or below said lower belt (10) an unwinding means is provided for a metal belt that adjoins the conveyor belt and moves along with same and, upon entering said intake gap, becomes adhered to said liquid plastic material.

12. Apparatus according to claim 1, wherein at least one of the containers (2) is connected to a means for admixing reinforcement fibers and is provided with a mixing means.

13. Apparatus according to claim 1, wherein said sealing members are made of silicone rubber.

14. Apparatus according to claim 1, wherein said guides are in the form of rivets.

15. Apparatus according to claim 3, wherein said continuous mold sections are made of silicon rubber.

16. Apparatus according to claim 5, wherein said stationary sealing members are of triangular profile.

17. Apparatus according to claim 6, wherein said measuring contacts are actively connected to the casting valve (5).

18. Apparatus according to claim 7, wherein said plates are made of stainless steel.

19. Apparatus according to claim 9, wherein said conveyor belts are provided with a coating of polytetrafluoroethylene.

20. Apparatus according to claim 3, wherein said continuous molds sections are provided with protrusions and recesses to align said continuous mold sections as they rotate with said conveyor belts.

21. Apparatus according to claim 11, wherein said metal belt is a metal foil.

22. Apparatus according to claim 1, wherein the liquid plastic material is caprolactam melt.

23. Apparatus for the manufacture of molded plastic articles such as sheets or profiles with two revolving conveyor belts (9, 10), said conveyor belts comprising an upper belt and a lower belt, said upper belt being on top of said lower belt, wherein said conveyor belts run on deflection rollers, wherein said conveyor belts are arranged essentially parallel to each other, wherein said conveyor belts have lateral edges and run concurrently with each other and at a distance of each other, and a distributor means (6) situated adjacent to an intake gap which is supplied via a line with liquid plastic material which solidifies into molded articles between the revolving conveyor belts (9, 10), wherein at least two containers (2) are provided which are connected via separate lines (4) to a mixing means (5) arranged upstream of the distributor means (6), wherein the said conveyor belts and said distributor means are enclosed in a chamber (22) which is provided at one front face, adjacent to said distributor means (6), with an intake opening (23) and at an opposite front face with an outlet opening (24) for the release of said molded plastic articles or profiles.

24. Apparatus according to claim 23, wherein, adjacent to said intake gap, a heating means (25) is provided.

25. Apparatus according to claim 24 wherein said heating means (25) is arranged outside said chamber (22) wherein a wall of said chamber adjacent to the intake gap is provided with a window (26) that allows heat radiation to permeate.

26. Apparatus according to claim 25, wherein said window is made of vitrified ceramics.

27. Apparatus according to claim 24, wherein said heating means is an electrical radiant heater.

28. Apparatus according to claim 23 wherein an extraction roller (36) is provided adjacent to said outlet opening (24) of said chamber (22), wherein said extraction roller receives said molded articles, and wherein a separating means (39) is provided which can be moved across said molded article thus forming discontinuous pieces of said molded article.

29. Apparatus according to claim 23 wherein said chamber (22) adjacent to each of said two front faces is provided with air openings (27, 28) which are connected to air circulation means arranged outside said chamber (22).

30. Apparatus according to claim 26, wherein said air circulation means are connected to a fan.

31. Apparatus according to claim 23, wherein below the longitudinal edges of said lower belt (10) collector troughs (33) are provided to collect leaking liquid plastic material, and wherein said collector troughs empty into a collector bin (34), wherein said collector troughs and said collector bin are connected to said closed chamber (22).

32. Apparatus according to claim 23, wherein the liquid plastic material is caprolactam melt.

* * * * *

UNITED STATES PATENT AND TRADEMARK OFFICE
CERTIFICATE OF CORRECTION

PATENT NO. : 6,343,924 B1
DATED : February 5, 2002
INVENTOR(S) : Rudolf Klepsch

It is certified that error appears in the above-identified patent and that said Letters Patent is hereby corrected as shown below:

<u>Title page,</u>
Item [73], Assignee, please correct the patent to read as follows:

-- [73]   Assignee: Firma Polytech Klepsch & Co. GmbH, Vienna (AT) --

Signed and Sealed this

Twentieth Day of August, 2002

Attest:

JAMES E. ROGAN
Attesting Officer       *Director of the United States Patent and Trademark Office*